United States Patent

Foss

[11] Patent Number: 5,131,066
[45] Date of Patent: Jul. 14, 1992

[54] OPTICAL FIBRE SPLICE TRAY ARRANGEMENT

[75] Inventor: Raymond C. Foss, Plymouth, United Kingdom

[73] Assignee: Bowthorpe-Hellerman Limited, Crawley, Great Britain

[21] Appl. No.: 689,777

[22] PCT Filed: Nov. 22, 1989

[86] PCT No.: PCT/GB89/01390
§ 371 Date: May 15, 1991
§ 102(e) Date: May 15, 1991

[87] PCT Pub. No.: WO90/06531
PCT Pub. Date: Jun. 14, 1990

[30] Foreign Application Priority Data

Nov. 26, 1988 [GB] United Kingdom ............... 8827658

[51] Int. Cl.⁵ ............... G02B 6/26; B65D 1/34
[52] U.S. Cl. ............... 385/135; 385/137;
206/557; 206/558; 206/564; 206/565
[58] Field of Search ............... 385/135, 136, 137;
206/316.1, 472, 473, 557, 558, 560, 564, 565

[56] References Cited

U.S. PATENT DOCUMENTS

| | | | |
|---|---|---|---|
| 4,266,853 | 5/1981 | Hutchins et al. | 385/135 |
| 4,373,776 | 2/1983 | Purdy | 385/135 |
| 4,489,830 | 12/1984 | Charlebois et al. | 385/135 X |
| 4,793,682 | 12/1988 | Cooper | 385/135 |
| 4,840,449 | 6/1989 | Ghandeharizadeh | 385/135 |
| 4,898,448 | 2/1990 | Cooper | 385/135 |
| 4,927,227 | 5/1990 | Bensel, III et al. | 385/135 |
| 5,069,523 | 12/1991 | Finzel et al. | 385/135 |
| 5,071,211 | 12/1991 | Debortoli et al. | 385/135 X |
| 5,071,220 | 12/1991 | Ruello et al. | 385/135 |

FOREIGN PATENT DOCUMENTS

| | | | |
|---|---|---|---|
| 1108904 | 9/1981 | Canada | 385/135 X |
| 0226805 | 7/1987 | European Pat. Off. | 385/135 X |
| 2570196 | 3/1986 | France | 385/135 X |

*Primary Examiner*—Brian Healy
*Attorney, Agent, or Firm*—David P. Gordon

[57] ABSTRACT

An arrangement for storing e.g. optical fibers and/or optical fiber splices within a splice closure comprises a generally circular tray (1) or preferably a plurality of such trays (1) in a stack, the tray or trays being mounted at an angle inclined to the longitudinal axis of the splice closure. The trays are supported on respective fingers (12) which can be flexed to pivot themselves and their trays away from a tray which it is desired to remove, so that the desired tray can be slipped out of the stack.

14 Claims, 4 Drawing Sheets

OPTICAL FIBRE SPLICE TRAY ARRANGEMENT

BACKGROUND OF THE INVENTION

This invention relate to an arrangement for storing elements, particularly optical fibers and/or optical fiber splices, within a splice closure.

Storage arrangements are used in splice closures in the joining of optical fiber cables. The splice closure is used to provide environmental protection and sealing of the joint in e.g. telecommunications and data transmission networks, which joints are formed either between cables or at the termination of a cable to terminal equipment.

The conventional arrangement for storing optical fibers at a joint to ensure a high degree of protection during the jointing process is to insert the fiber into a tray or attach it to a plate. The trays or plates are then stacked one above the other in a cassette stacking arrangement. The tray or plate either singular or multiple is positioned inline with the cable entry ports.

This arrangement has various disadvantages. For example, splice closures are generally cylindrical in shape to improve sealing performance and ease of re-entry. However, cylindrical shape closures doe not allow the maximum use of available space when stacking a multiplicity of trays in line with the cable entry ports. In order to ensure that the required number of trays can be fitted without increasing the outside diameter of the closure, the width of tray has to be reduced. The arrangement when viewed from the side (at 90 degrees to cable entry), involves fitting a rectangular mass into a cylindrical cavity and requires a reduction in the width of the tray or plate, reducing the maximum bend radius which is available for the fiber within the tray or plate, and so introducing a degree of light loss through the wall of the fiber. It is desirable to maintain as large a bend radius as possible for the optical fiber, to minimize the losses and improve the operating efficiency of the network.

Inline cassette arrangements have the further disadvantages of limiting the height of the stack of trays and limiting the space available within the joint for the free passage of excess fibers or fiber carrying tubes around the jointing space over the entire length of the joint.

SUMMARY OF THE INVENTION

In accordance with this invention there is provided an arrangement for storing elements within a splice closure, comprising at least one generally circular tray for receiving the elements to be stored, and means for mounting the tray at an angle inclined to a longitudinal axis of the splice closure.

The generally circular splice tray may be used to store one or more splices between the signal transmitting filaments (e.g. particularly optical fibers) of the interconnected cables or interconnected cable and terminal equipment. The splice tray may be used instead or in addition to store lengths of the signal transmitting filaments. Preferably a plurality of the generally circular trays are stacked one upon another, all the trays, being similarly inclined to the longitudinal axis of the splice closure.

With this arrangement, a splice closure of a given diameter or cross-section can accommodate a tray (or trays) of an adequate diameter and still have space between the trays and the internal surface of the closure for passage of cables or their transmission filaments as required. The transmission filaments (particularly optical fibers) can be coiled within the tray to an adequate bending radius.

Preferably the means for mounting the trays allows any one of these to be removed without having to remove other trays. Preferably the trays are supported on respective fingers which can be flexed for pivoting trays away from a tray which is to be removed, so that this tray can be slipped out.

An embodiment of this invention will now be described by way of example only and with reference to the accompanying drawings.

DETAILED DESCRIPTION OF THE PREFERRED EMBODIMENT

Figure 2A:
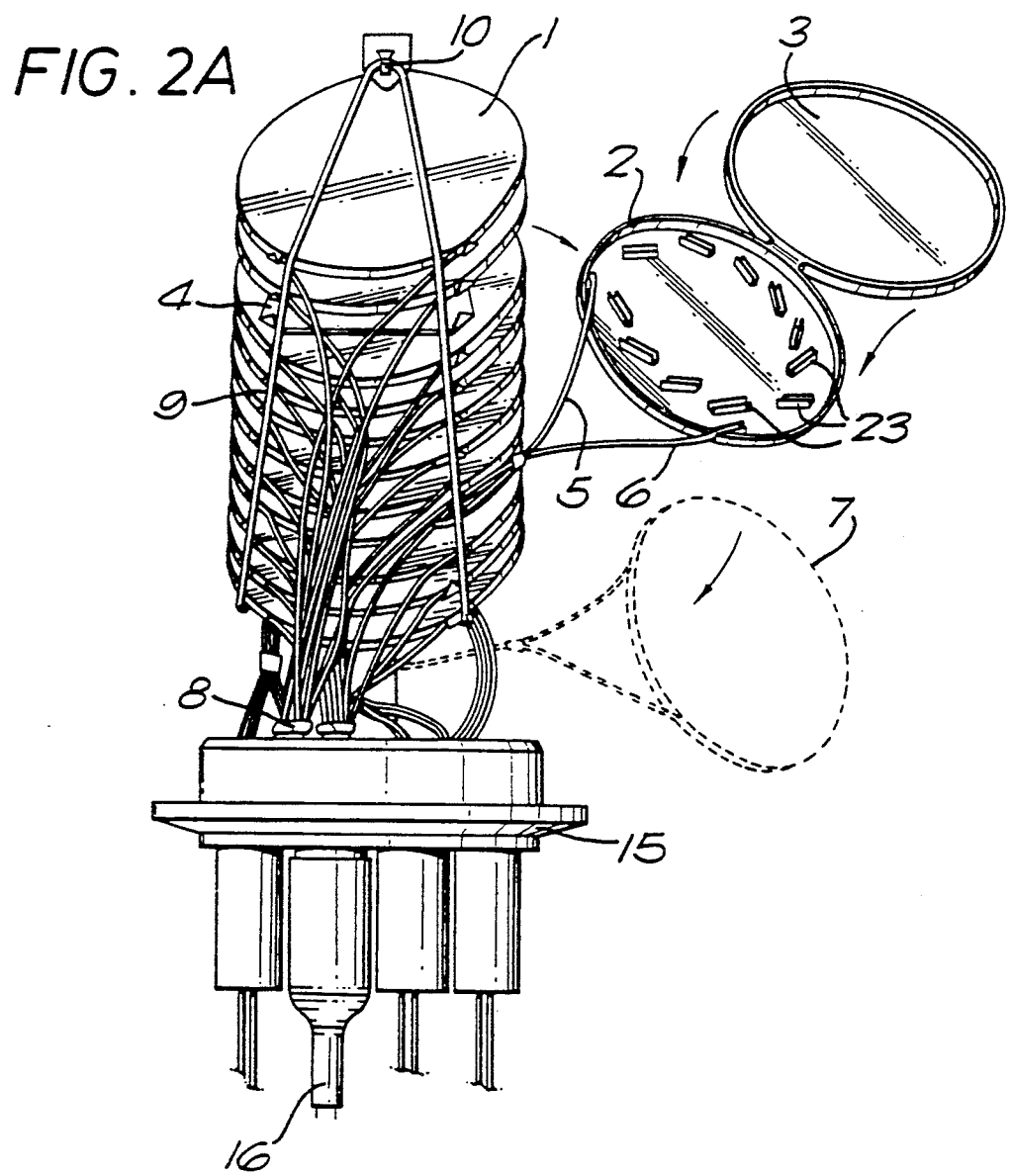
FIG. 2A is a view of an optical fiber cable joint incorporating the storage arrangement with a closure sleeve of the joint removed.
Figure 2B:
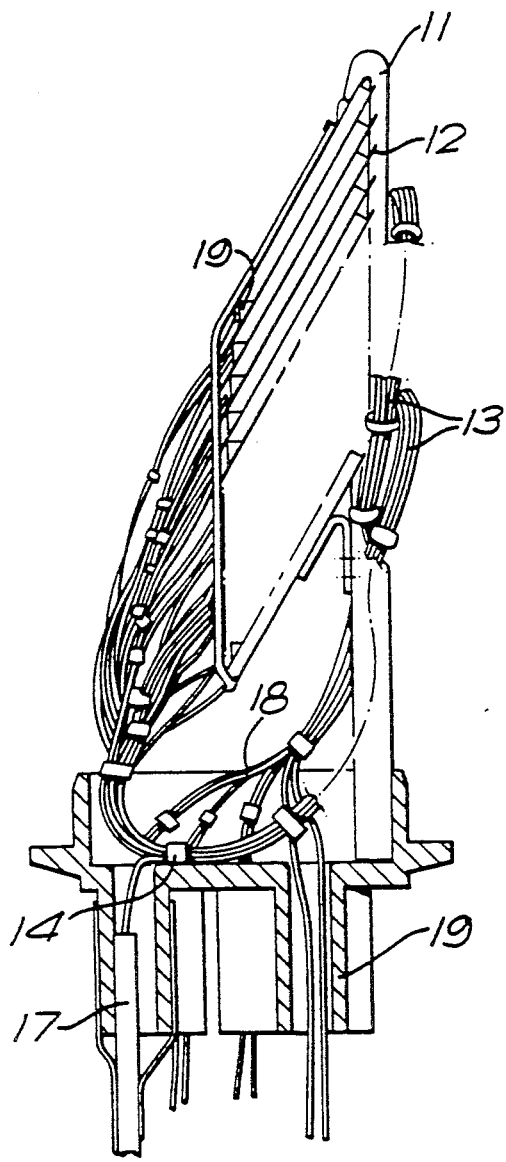
FIG. 2B is a view from the right hand side of the joint shown in FIG. 2A.
Figure 4A:
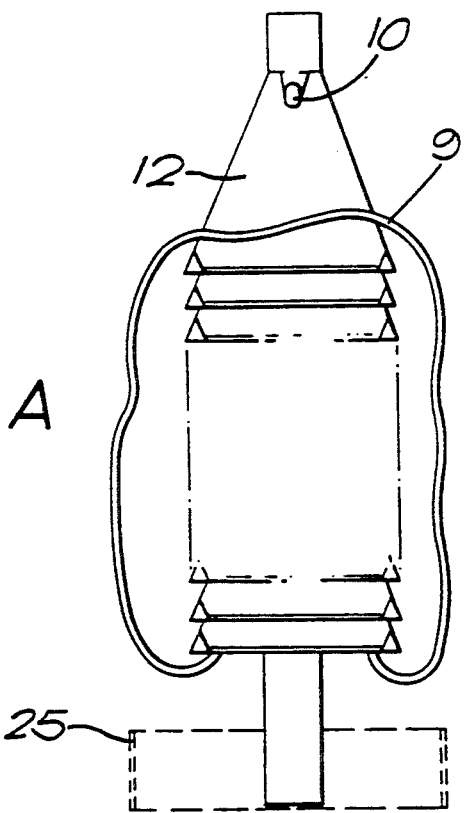
FIG. 4A is a front view of a mounting assembly for a plurality of the trays in the storage arrangement.
Figure 2C:
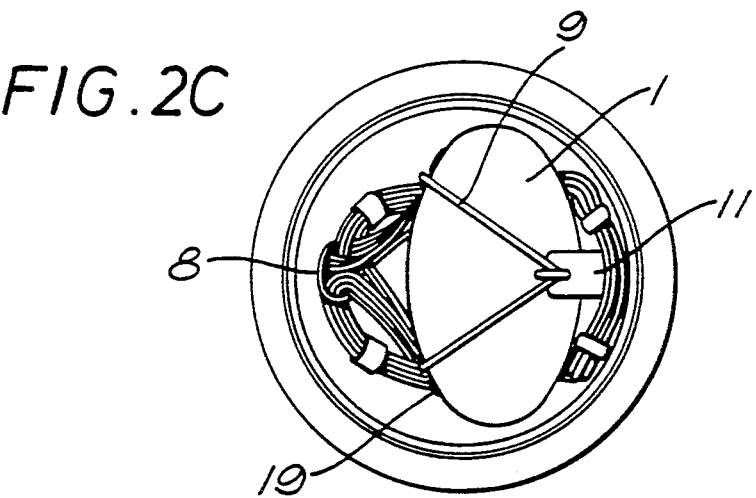
FIG. 2C is an end view of the joint shown in FIGS. 2A and 2B.

Referring to the drawings, there is shown a storage arrangement for splices and/or lengths of optical fibers in a joint between one optical fiber cable and another or between one optical fiber cable and terminal equipment. In FIG. 2, the splice closure comprises a base 15 but the joint is shown with the sleeve or cover member removed to expose the storage arrangement. Cables 17 enter the closure through the base 15 via respective entry ports 19, to which they are sealed by heat-recovered sleeves 16.

Figure 5:
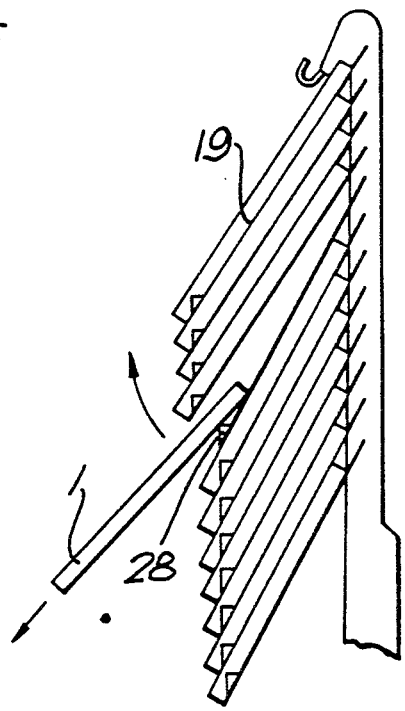
FIG. 5 is a side view of the storage arrangement illustrating the removal of a tray from a stack of such trays.
Figure 4D:
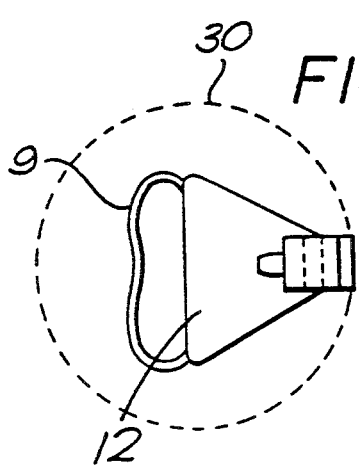
FIG. 4D is an end view of the mounting assembly.
Figure 4B:
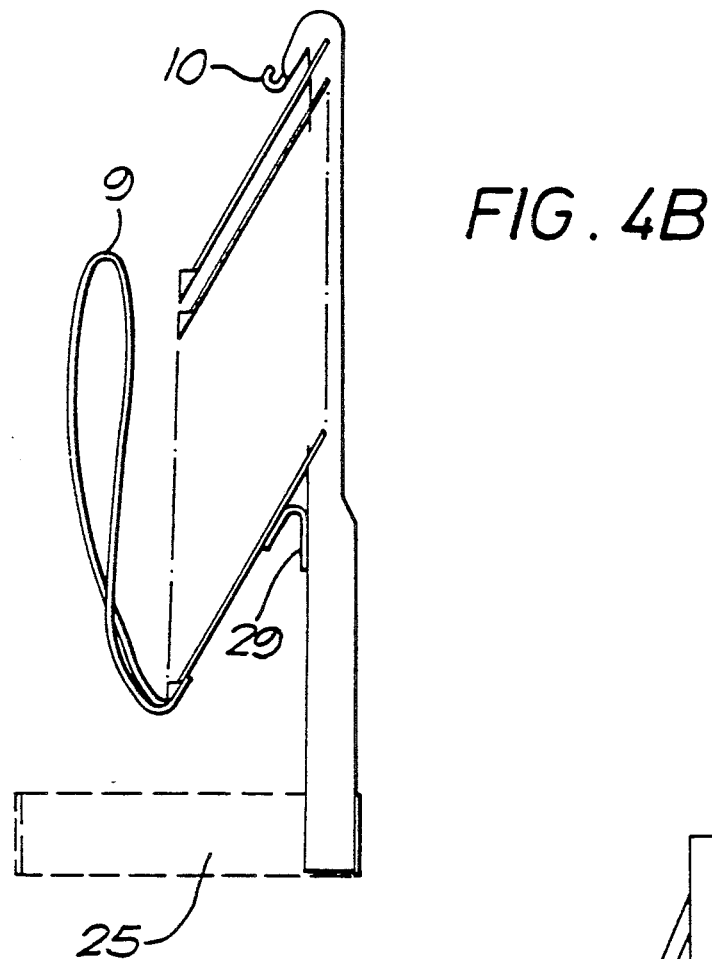
FIG. 4B is a side view of the mounting assembly of FIG. 4A.
Figure 4C:
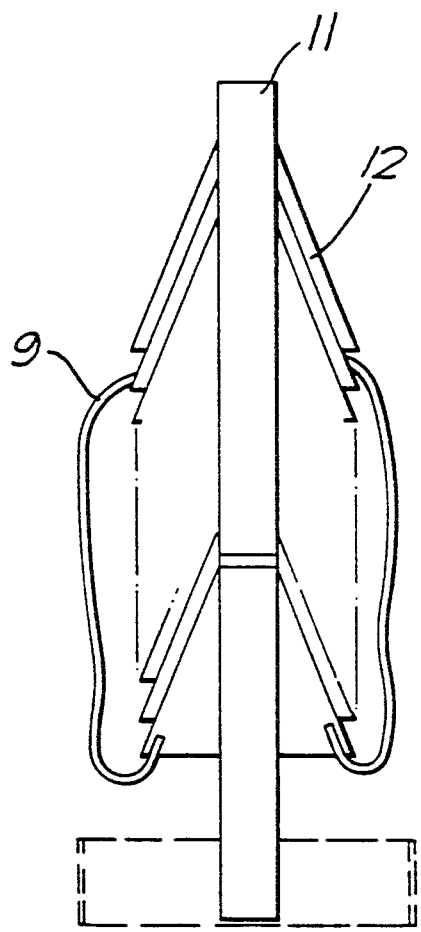
FIG. 4C is a rear view of the mounting assembly.

The storage arrangement comprises a plurality of circular trays 1 and a mounting arrangement for the trays. The mounting arrangement comprises an upright pillar 11 mounted to the base 15, from which a plurality of fingers 12 project downwardly. The trays 1 are supported on respective fingers 12 and are located and retained in place on their fingers 12 by projections 28 on the upper face of each finger 12 adjacent its lower edge. It will be noted that each finger 12 is generally triangular with its apex joined to the support pillar. The fingers 12 exhibit a degree of flexibility so that, as shown in FIG. 5, the trays and fingers 12 above a tray to be removed can be pivoted up so that this latter tray can be lifted over its retaining projections 28 and slid out. The assembly or stack of trays are held together by an elastic strap 9 having its opposite ends connected to opposite outer corners of the lowermost finger 12, and being looped over a hook 10 at the top of the support pillar. In order to remove a tray as just described, firstly the strap 9 is disengaged from the hook 10.

It will be noted that the support pillar extends adjacent the periphery of the joint closure and the trays are all inclined to the longitudinal axis of the closure, preferably at an angle of 30°. With this arrangement, space is left between the trays and the opposite inner periphery of the closure cover to accommodate cables or optical fibers running to or from the trays. Also the rear of the support pillar is cut-away above a certain level to accommodate further cables or optical fibers.

Each tray comprises a base 2 for receiving the optical fibers and/or optical fiber species, and a cover 3 which clips over the base 2. The cover 3 may be integrally hinged to the base 2 as shown or it may be a separate component.

Figure 1:
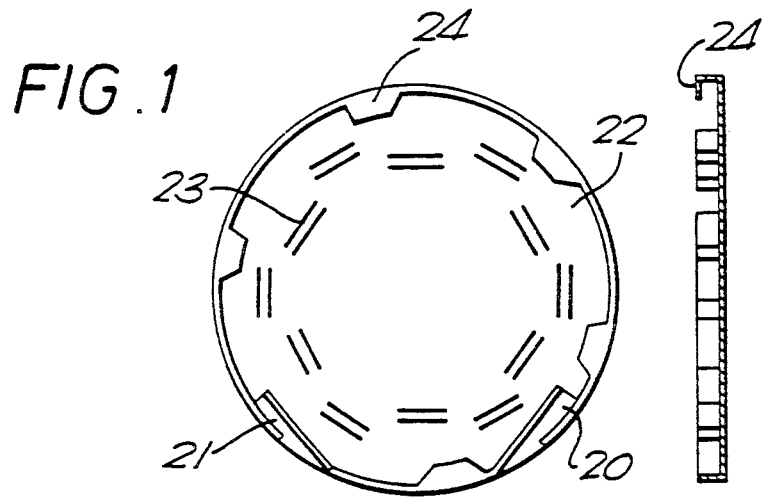
FIG. 1 gives a plan view and a cross-section through a tray used in a storage arrangement in accordance with this invention.
Figure 3:
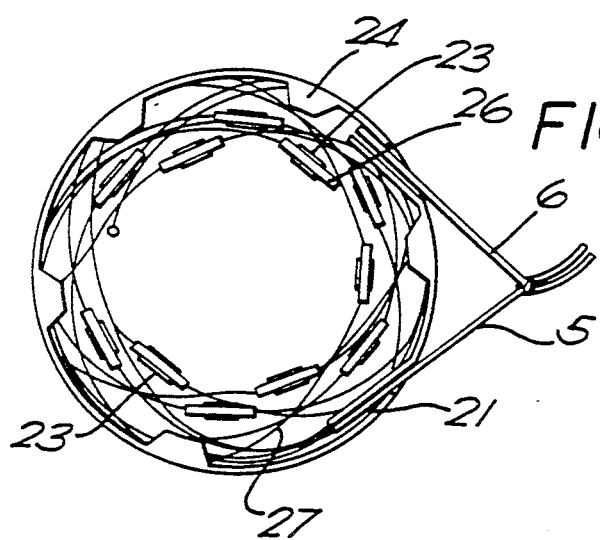
FIG. 3 is a plan view of the tray shown in FIG. 1 with optical fiber splices assembled to it.

Each tray enables optical fibers to be coiled within its base 2 in a circular form at the periphery of the tray to maximize the bend radius of the fiber. Each fiber splice 26 is held in place between a pair of fingers 23; a plurality of such pairs of fingers are provided on the base 2 of each tray, being spaced apart around two circles of different radii close to the periphery of the tray (see FIG. 1 and 3). The fibers are retained by lugs 24 which are spaced around the top of a peripheral wall of the base 2 of each tray and project radially inwards. Each tray may carry up to twelve splices in the example shown.

Each tray has a two fiber carrying tubes 20, 21 (FIG. 1) fixed to the entry and exit apertures in the peripheral wall of its base 2. These tubes are generally tangential of the base periphery and define converging paths to guide the pairs of fibers down to a point 8 adjacent the base 15, from which point the fibers pivot when a tray is removed or replaced in the stack (see 7 in FIG. 2A). Normally the jointing engineer would remove one tray at a time from the stack to carry out repair work or add new splices.

The trays can be formed e.g. from metal or plastics preferably ABS either injection molded or thermoformed in one or more parts fixed together. The support fingers 12 are formed from thin flexible material, e.g. metal or plastics but preferably spring steel or had aluminum. The fingers may be fixed into slots in the support pillar by high strength adhesive. Preferably the support pillar is of light and high strength material e.g. aluminum. Preferably the support pillar is removably engaged in a socket or the like formed in the base 15.

I claim:

1. An arrangement for storing elements within a splice closure, comprising a plurality of generally circular trays for receiving the elements to be stored, and means for mounting the trays in a stack one upon another, with all of the trays disposed at an angle inclined to a longitudinal axis of the stack, the mounting means allowing any one of the trays to be removed without requiring removal of the other trays and comprising a plurality of fingers, one for each tray, on which the respective trays are supported, which fingers can be flexed for pivoting trays away from a tray which is to be removed, so that this tray can be removed.

2. An arrangement as claimed in claim 1, in which the mounting means comprises a support pillar from which said fingers project at said angle inclined to the longitudinal axis of the stack.

3. An arrangement as claimed in claim 1, in which each tray comprises a base for storing said elements, and a cover which fits over the base.

4. An arrangement as claimed in claim 3, in which the base of each tray is formed with two guideways generally tangential to the periphery of the base, for the entry and exit of elements being stored in the respective tray.

5. An arrangement as claimed in claim 4, in which the entry and exit guideways define converging paths to guide the pair of elements received therein to a point adjacent one end of the splice closure, from which the elements can pivot to allow the respective tray to be displaced from the stack of trays.

6. An arrangement as claimed in claim 3, in which the base of each tray is formed with a plurality of pairs of splice mounting means, each pair of fingers serving to hold a splice therebetween.

7. An arrangement as claimed in claim 2, in which each tray comprises a base for storing said elements, and a cover which fits over the base.

8. An arrangement as claimed in claim 7, in which the base of each tray is formed with two guideways generally tangential to the periphery of the base, for the entry and exit of elements being stored in the respective tray.

9. An arrangement as claimed in claim 8, in which the entry and exit guideways define converging paths to guide the pair of elements received therein to a point adjacent one end of the splice closure, from which the elements can pivot to allow the respective tray to be displaced from the stack of trays.

10. An arrangement as claimed in claim 4, in which the base of each tray is formed with a plurality of pairs of splice holding means, each pair of splice holding means serving to hold a splice therebetween.

11. An arrangement as claimed in claim 5, in which the base of each tray is formed with a plurality of pairs of splice holding means, each pair of splice holding means serving to hold a splice therebetween.

12. An arrangement as claimed in claim 7, in which the base of each tray is formed with a plurality of pairs of splice holding means, each pair of splice holding means serving to hold a splice therebetween.

13. An arrangement as claimed in claim 8, in which the base of each tray is formed with a plurality of pairs of splice holding means, each pair of splice holding means serving to hold a splice therebetween.

14. An arrangement as claimed in claim 9, in which the base of each tray is formed with a plurality of pairs of splice holding means, each pair of splice holding means serving to hold a splice therebetween.

* * * * *